(12) United States Patent
Liu et al.

(10) Patent No.: US 11,790,293 B2
(45) Date of Patent: Oct. 17, 2023

(54) PATTERN ANALYSIS FOR SCHEDULE OPTIMIZATION

(71) Applicant: International Business Machines Corporation, Armonk, NY (US)

(72) Inventors: Su Liu, Austin, TX (US); Debbie Anglin, Leander, TX (US); Rui Yang, Austin, TX (US); Paul Bernell Finley, Jr., Austin, TX (US); Amir Sanjar, Austin, TX (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 409 days.

(21) Appl. No.: 17/120,773

(22) Filed: Dec. 14, 2020

(65) Prior Publication Data

US 2022/0188739 A1   Jun. 16, 2022

(51) Int. Cl.
| | |
|---|---|
| G06Q 10/0631 | (2023.01) |
| G06Q 10/1093 | (2023.01) |
| G06N 5/04 | (2023.01) |
| G06Q 50/26 | (2012.01) |
| G01B 21/16 | (2006.01) |

(Continued)

(52) U.S. Cl.
CPC ..... *G06Q 10/063116* (2013.01); *G01B 21/16* (2013.01); *G06F 16/2477* (2019.01);
(Continued)

(58) Field of Classification Search
CPC .......... G06Q 10/06; G06Q 10/063116; G06Q 10/06316; G06Q 10/1097; G06Q 30/04;
(Continued)

(56) References Cited

U.S. PATENT DOCUMENTS 11,017,688 B1 *  5/2021  Arazi ................... H04W 4/029
11,056,242 B1 *  7/2021  Jain ....................... G16H 10/60
(Continued)

FOREIGN PATENT DOCUMENTS

| IN | 202011023853 A | 8/2020 |
| IN | 202011035808 A | 9/2020 |

OTHER PUBLICATIONS

Epazz DeskFlex Desk & Room Scheduling Social Distance Features Winning New Contracts with Government Agencies and Healthcare Providers Amidst COVID-19 Pandemic. Database of Press Releases Related to Africa [Lausanne] Sep. 15, 2020.*
(Continued)

*Primary Examiner* — Timothy Padot
(74) *Attorney, Agent, or Firm* — Garg Law Firm, PLLC; Rakesh Garg; Nathan Rau

(57) ABSTRACT

An embodiment includes generating first and second preliminary schedules for respective first and second workers assigned respective first and second tasks, detects a block of time that is part of both the first and second preliminary schedules, and generates respective first and second location predictions for the first and second workers during the block of time. The embodiment calculates a distance between the first and second workers based on the first and second location predictions, and revises, responsive to determining that the distance is less than a threshold value, the second preliminary schedule to replace the first block of time with a second block of time that is not part of the first preliminary schedule. The embodiment generates an access control list that includes the first preliminary schedule as a first access schedule for the first worker for use in responding to access queries.

20 Claims, 8 Drawing Sheets

(51) Int. Cl.
*H04L 9/40* (2022.01)
*G06F 16/2458* (2019.01)
*G06N 20/00* (2019.01)
*G06Q 30/04* (2012.01)

(52) U.S. Cl.
CPC .............. *G06N 5/04* (2013.01); *G06N 20/00* (2019.01); *G06Q 10/06316* (2013.01); *G06Q 10/1097* (2013.01); *G06Q 30/04* (2013.01); *G06Q 50/26* (2013.01); *H04L 63/101* (2013.01)

(58) Field of Classification Search
CPC .... G06Q 50/26; G01B 21/16; G06F 16/2477; G06N 5/04; G06N 20/00; H04L 63/101
USPC ...................................................... 705/7.16
See application file for complete search history.

(56) References Cited

U.S. PATENT DOCUMENTS

| | | | |
|---|---|---|---|
| 2018/0039931 A1* | 2/2018 | Dotson | H04L 67/10 |
| 2020/0219036 A1* | 7/2020 | Decamp | H04W 4/021 |
| 2020/0410250 A1* | 12/2020 | Miller | G06V 20/20 |
| 2021/0313075 A1* | 10/2021 | McNamara | G08B 21/22 |
| 2021/0398016 A1* | 12/2021 | Tsimerman | G06F 18/254 |

OTHER PUBLICATIONS

Open Safe: Here Are a Few Essential Tools to Facilitate Social Distancing and Protect the Health of Staff And Patrons During Phased Reopening. Denice Rovira Hazlett. Library Journal145.8: 20. MSI Information Services. (Aug. 2020).*

Nasajpour et al., Internet of Things for Current COVID-19 and Future Pandemics: An Exploratory Study, Sep. 25, 2020.

Nguyen et al., Enabling and Emerging Technologies for Social Distancing: A Comprehensive Survey and Open Problems, Sep. 22, 2020.

Salimi et al., A generalized inhomogeneous Markov chain occupancy model for open-plan offices using Real Time Locating System data, 16th IBPSA International Conference and Exhibition, Sep. 2-4, 2019.

Wang et al., Occupancy prediction through Markov based feedback recurrent neural network (M-FRNN) algorithm with WiFi probe technology, Jun. 2018.

* cited by examiner

*Fig. 8*

| USERS | T1 | T2 | T3 | T4 | T5 | T6 |
|---|---|---|---|---|---|---|
| USER-A | | | | | | |
| USER-B | | 802 | | | | |
| USER-C | | | | | | |
| USER-D | | | 804 | | | |
| USER-E | | | | | | |
| USER-F | | | | | | |
| USER-G | | | | | | |

800

US 11,790,293 B2

PATTERN ANALYSIS FOR SCHEDULE OPTIMIZATION

BACKGROUND

The present invention relates generally to a method, system, and computer program product for generating work schedules. More particularly, the present invention relates to a method, system, and computer program product for pattern analysis for schedule optimization.

One of several standard management tasks is to prepare and disperse work schedules. In many cases, workers are assigned fixed recurring work schedules that rarely change. In other cases, workers have schedules that change from time to time, for example on a daily or weekly basis. Changes to work schedules may include changes to the days, hours, or locations assigned to workers. For example, field service technicians may work in different locations daily according to work orders they are assigned. Other workers, such as call center agents, are assigned shift times that vary from time to time. In such cases, managers are tasked with preparing work schedules on a regular basis. Managers must carefully prepare such schedules to match projected demand and accommodate worker schedule requests to the extent possible. As a result, the task of preparing work schedules can be a challenging and time-consuming process.

SUMMARY

The illustrative embodiments provide for time and spatial pattern analysis for schedule optimization. An embodiment includes generating a first preliminary schedule for a first worker assigned a first task. The embodiment also includes generating a second preliminary schedule for a second worker assigned a second task. The embodiment also includes detecting a first block of time that is part of the first preliminary schedule and the second preliminary schedule. The embodiment also includes generating a first location prediction for the first worker during the first block of time. The embodiment also includes generating a second location prediction for the second worker during the first block of time. The embodiment also includes calculating a distance between the first worker and the second worker based on the first location prediction and the second location prediction. The embodiment also includes revising, responsive to determining that the distance is less than a threshold value, the second preliminary schedule to replace the first block of time with a second block of time that is not part of the first preliminary schedule. The embodiment also includes generating an access control list that includes the first preliminary schedule as a first access schedule for the first worker. The embodiment also includes responding to an access query regarding the first worker by referring to the first access control list and determining whether the first access schedule includes a time associated with the access query. Other embodiments of this aspect include corresponding computer systems, apparatus, and computer programs recorded on one or more computer storage devices, each configured to perform the actions of the embodiment.

An embodiment includes a computer usable program product. The computer usable program product includes a computer-readable storage medium, and program instructions stored on the storage medium.

An embodiment includes a computer system. The computer system includes a processor, a computer-readable memory, and a computer-readable storage medium, and program instructions stored on the storage medium for execution by the processor via the memory.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of the illustrative embodiments when read in conjunction with the accompanying drawings, wherein:

FIG. 8 depicts a flowchart of an example schedule in accordance with an illustrative embodiment.

DETAILED DESCRIPTION

Figure 1:
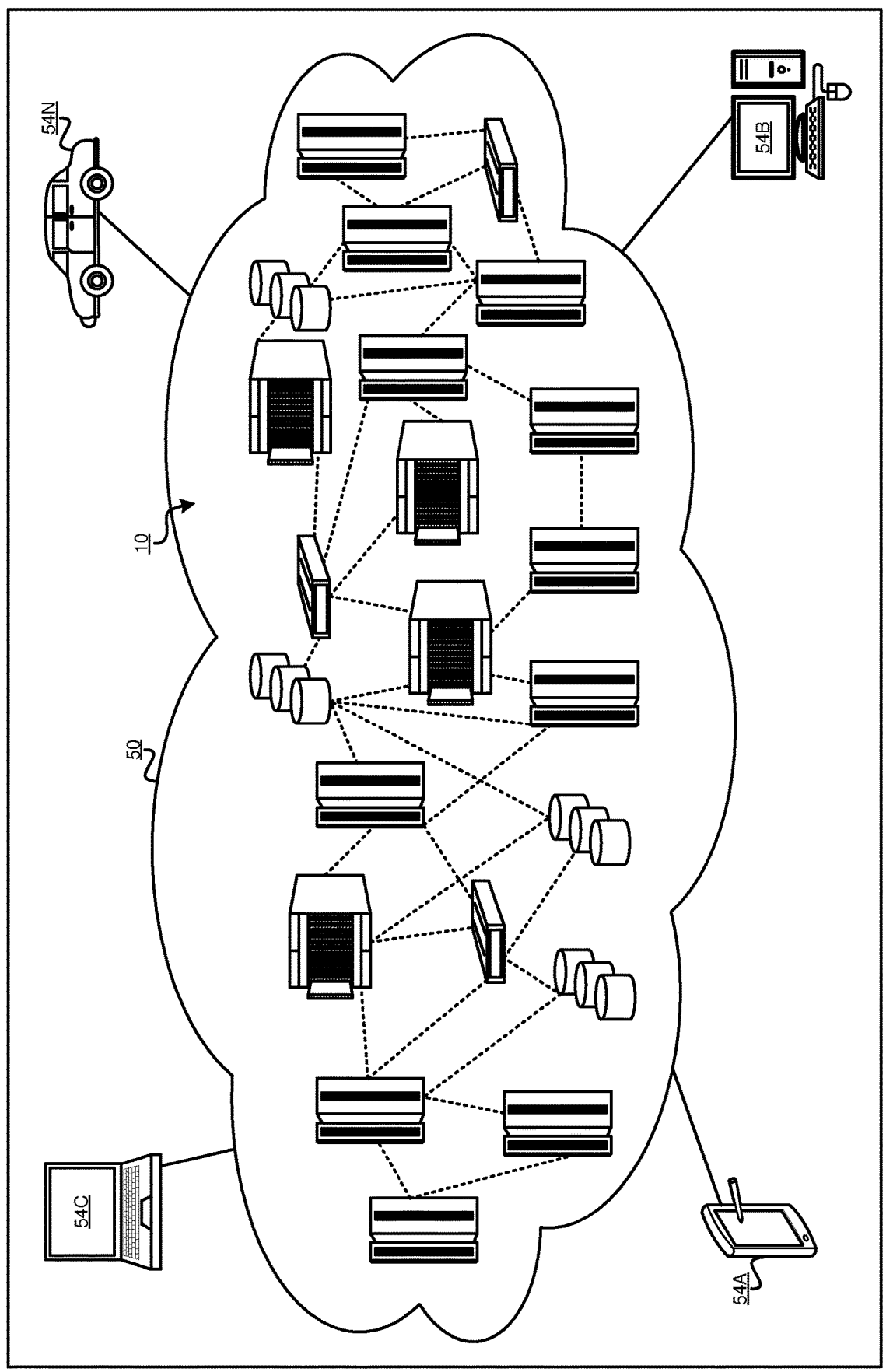
FIG. 1 depicts a cloud computing environment according to an embodiment of the present invention.

In many businesses or other such organizations that have workers that work varying work schedules, managers are tasked with preparing work schedules on a regular basis. Preparing such work schedules is a time-intensive task that is prone to human error, particularly in larger organizations in which workers work various shifts, in various locations, and subject to various other constraints. In many situations, the number of constraints and workers involved make it impractical for supervisors to manually create work schedules that optimally account for all relevant constraints. For instance, it would be impractical for supervisors to manually create work schedules that optimally account for constraints that include minimum time overlap, maximum time coverage, minimum social distancing, and maximum capacity in a given time and space.

The present embodiments recognize that, due to the complexity of preparing work schedules many workers subject to many constraints, many constraints are not implemented, enforced, or accounted for when schedules must be manually created. Therefore, present embodiments leverage machine-learning technology to prepare schedules that are optimized for a constraints that would otherwise be impractical or impossible for a human schedule preparer to manually create without the aid of artificial intelligence systems.

The present embodiments also recognize that extraordinary circumstances occasionally arise that can dramatically affect scheduling constraints. For example, situations may arise in which government agencies recommend or mandate one or more strategies to control the spread of disease, such as quarantine, school and workplace closures, travel restrictions, provision of masks, and social distancing.

Social distancing measures, such as the measures recommended by public health authorities of numerous countries in view of pandemics, have been proven to be an efficient way to reduce a virus spread rate. Implementation of social distancing measures also allows certain non-essential businesses to remain open when partial lockdowns are ordered by authorities (e.g., due to an epidemic situation). When appropriate social distancing policies are established and enforced in a workplace environment, workers may continue working without significantly increasing their chance of contracting a virus.

Additionally, it has been observed that during an epidemic leading to partial or total lockdowns, essential businesses must continue to provide their goods and services to the general population. Such companies have workers that may find themselves working in closed spaces and in proximity with other workers. In such situations, employers face challenges in setting up, maintaining, and enforcing safety habits throughout their organization. For example, following health authorities' regulations on social distancing with a minimum of 2 m between people may be hard to implement in certain work environments. As a matter of fact, it is often hard to maintain good environmental awareness while concentrating on performing a task, such that the 2 m distance may not always be observed.

The present embodiments recognize that existing computerized scheduling solutions exist for generating worker schedules, but such scheduling solutions lack the functionality for generating a worker schedule that satisfies social distancing constraints. This represents a technical problem, as many scheduling tasks require generating worker schedules that satisfy a wide range of constraints for a large number of workers. During times when social distancing measures are mandated, the social distancing constraints become a top priority. However, since existing scheduling solutions lack this functionality, they are rendered useless because employers are unable to use such systems to generate worker schedules that can be implemented. This means employers must try to generate schedules manually, which in many situations cannot replicate the computer-generated schedules that are able to generate worker schedules that satisfy a large variety of constraints.

The illustrative embodiments address and solve this technical problem by providing a worker scheduling solution that introduces a social distancing factor into worker scheduling processes, such as generating worker calendars or workplace control lists, for example for badge access (or other authentication-based access control mechanisms) in a given time and space. In some embodiments, a worker scheduling application leverages artificial intelligence and machine learning algorithms to perform worker distancing analysis for candidate schedules to identify an optimized schedule that satisfies social distancing constraints.

In an illustrative embodiment, a scheduling solution comprises an Intelligent Badge Access Scheduling (IBAS) application that adapts to risk conditions which, when present, cause or increase the likelihood that workers will be exposed to situations that have the potential to negatively affect their health. For example, in some embodiments, risk conditions include situations where workers have the potential to be exposed to pathogens associated with dysfunction of normal homeostatic processes, such as exposure to contagious diseases. For example, public health recommendations include "physical distancing" or "social distancing" guidelines that encourage people to maintain a physical distance of about 6 feet (or about 2 meters) from other people to prevent the spread of contagious diseases. A risk condition would therefore be recognized where two workers have a high likelihood of being within a specified distance associated with a physical distancing parameter.

In an illustrative embodiment, an IBAS application adapts to risk conditions involving social distancing constraints by performing social distancing pattern analysis that enforces social distancing in generated worker schedules and access control lists. In some embodiments, the IBAS application detects and prevents schedules in which two or more workers overlap in both time and space closer than what is specified by social distancing constraints. In some embodiments, the IBAS application executes in fully automated mode after the scheduling tool has been provided with one or more parameters set to avoid production of schedules that include undesirable risk conditions. In some embodiments, the scheduling tool executes in semiautomated mode in which scheduling decisions made by the scheduling tool may be validated by a human user, such as a system administrator or scheduling administrator. In some such embodiments, the user provides feedback on the schedule to the scheduling tool, and the scheduling tool may make one or more changes to the schedule based on such feedback.

In an illustrative embodiment, an IBAS application defines, stores, and manages a service profile, user profiles, and a data structure. In some embodiments, the IBAS application includes a user interface that allows a user to configure and manage a basic badge access schedule. In some such embodiments, the user interface includes a graphical user interface (GUI), a command line interface, and/or an IBAS management dashboard. In some embodiments, the interface allows a user to submit various user inputs to the IBAS management dashboard, including schedule requests and access control list requests. In some embodiments, the interface allows a user to set configuration parameters for a schedule request and/or an access control list request. In some embodiments, the interface allows a user to edit the service profile, the user profiles, and the data structure.

In some embodiments, the IBAS application allows a user, such as a system administrator, to view or edit the service profile. In some such embodiments, the service profile is a service configuration file for defining and configuring the IBAS application. For example, in some embodiments, the service profile includes constraints related to office space arrangement and availability. Such constraints may include, for example, minimum distance values used as social-distancing constraints. Such constraints may include, for example, a description of workspaces where workers are scheduled to work, such as a floor plan or office layout. Such constraints may also include a description of workspace availability, such as hours during which the workspace may or may not be available for use and times during which meeting rooms are occupied or are available for use. Such constraints may also include capacity information, such as worker capacity limits for workspaces.

In some embodiments, the IBAS application allows a user, such as a system administrator or worker, to view or edit the user profiles. In some embodiments, the user profiles include a plurality of profiles for respective workers. In some embodiments, the user profiles are combined in a single file that includes profile information for a plurality of workers. In some embodiments, the IBAS application allows users to edit their respective profiles to include customized profile information, such as information about personal characteristics and preference settings. In some embodiments, preference settings include preference data representative of a schedule preferences of one or more workers, such as preferred days, hours, shifts, or other such information. For example, in some embodiments, user profiles include schedule preference data representative of schedule preferences of workers collected in response to worker surveys. In some embodiments, user profiles include preference information regarding notification preferences indicative of how the worker prefers to receive schedules and other work-related information.

In the illustrated embodiment, the IBAS application allows a user, such as a system administrator or worker, to view or edit the data structure. In some embodiments, the IBAS data structure refers to a module for data structure for saving and track users' movement patterns and predicted social distance, and scheduled badge accessing times. As a non-limiting example, a data structure includes fields such as ReaderID, Priority[UserID][TaskID], MinimumDistance, StartTime, and EndTime, as well as other attributes and contexts for helping to analyze and predict users' activity patters in certain space and time, for example location, start day of week, end day of week, duration of daily work, number of consecutive work days worked, work environment (e.g., lab, cubical, office, reception area), job description/duties, and availability and proximity to designated break areas each activity episode. In some embodiments, one or more of these fields can be populated with associated values established by a system administrator. In some embodiments, a system administrator can update the data structure or data stored in the data structure in real time, for example to expand the capabilities of the IBAS application.

In some embodiments, the IBAS application collects all users' tasks with priorities from the IBAS sensors. The sensors may include any of a variety of available sensors, including known Internet of Things (IOT) sensors, that may be used to collect information about worker workspace locations and movement habits. In some embodiments, the application communicates with one or more remotely located sensors via a network connection. For example, in some embodiments, a workspace has one or more sensors located in various locations that are able to sense information regarding worker locations, tasks, or other information. In some such embodiments, the sensors provide the sensed information via ethernet or Wi-Fi to the IBAS application. In some such embodiments, the sensors provide the sensed information along with time information indicative of when the sensed data was sensed by a sensor.

In some embodiments, the IBAS application is a microservice engine that receives clients' inputs, learns users' movement patterns over time and space, and predicts given users' locations and social distances. In some embodiments, the IBAS application learns and analyzes time distribution of workers in a given workspace, and defines and tracks workers that will be scheduled to be in the workspace during overlapping time periods. In some embodiments, the IBAS application learns and analyzes the spatial distribution of workers in the workspace, and defines and tracks the respective locations of workers that are working at the workspace during overlapping time periods. In some embodiments, IBAS application uses a machine learning model to predict, detect, and prevent work assignments or worker schedules that are likely to result in workers being located in the workspace in a location that is too close to other workers to satisfy minimum social distancing guidelines.

In some embodiments, the IBAS application performs pattern analysis to predict whether workers present during overlapping time periods are likely to maintain social distancing guidelines in a shared work area. In some embodiments, the IBAS application uses historical user behavior information to predict social distancing problems in schedules or access lists.

In some embodiments, the IBAS application ingests location information to generate location pattern predictions. In some embodiments, location pattern predictions are location patterns such as times when a worker is at various workplace locations. In some embodiments, the patterns also characterize when a worker will leave a location and which location they will be going to next. In some embodiments, the modeling of the patterns relies on a plurality of pattern models. In some such embodiments, a pattern model is an algorithmic model that predicts location based on past location information. A pattern model may be geared to a specific type of pattern such as time frame or location type. In some embodiments, the pattern models are Markov chains, but alternatively a pattern model may be a neural network, a statistical model, machine learning approach, or any suitable pattern model. In some embodiments, each Markov chain is associated with different workers. For example, in some embodiments, a first Markov chain characterizes location patterns during a workday for a first worker, and a second Markov chain characterizes location patterns during a workday for a second worker.

In some embodiments, the IBAS application generates preliminary worker schedules. In some embodiments, the IBAS application compares location patterns associated with different workers in the preliminary schedule who will be in the workplace during overlapping time periods. In some embodiments, the IBAS application generates an access control list that includes blocks of time and respective lists of workers that are allowed to be in the workplace during the respective time blocks. In some embodiments, the access control list is used by a building security system that controls access points to the workspace.

In some embodiments, the IBAS application maintains a list of workers and respective access credential information. For example, in some embodiments, the IBAS application incudes information that allows a remote card reader to determine which worker is associated with a card that was just scanned.

In some embodiments, a client device communicates with the IBAS application, for example using an API that allows remote devices to interface with the IBAS application. As a non-limiting example, in an embodiment, the client device is a card reader device that executes an access routine to determine whether to grant access to a workspace in response to a sensed access card. In some such embodiments, the client device interfaces with the IBAS application in order to identify the worker associated with the sensed access card and whether that worker is authorized to access the workspace at the time when the access card was sensed. In some such embodiments, the IBAS application identifies the worker and checks the access control list to determine the access times for the identified worker. The IBAS application then issues a response to the client device, where the response indicates the identity of the worker and/or whether the identified worker is presently allowed to have access to the workspace.

For the sake of clarity of the description, and without implying any limitation thereto, the illustrative embodiments are described using some example configurations. From this disclosure, those of ordinary skill in the art will be able to conceive many alterations, adaptations, and modifications of a described configuration for achieving a described purpose, and the same are contemplated within the scope of the illustrative embodiments.

Furthermore, simplified diagrams of the data processing environments are used in the figures and the illustrative embodiments. In an actual computing environment, additional structures or component that are not shown or described herein, or structures or components different from those shown but for a similar function as described herein may be present without departing the scope of the illustrative embodiments.

Furthermore, the illustrative embodiments are described with respect to specific actual or hypothetical components only as examples. The steps described by the various illustrative embodiments can be adapted for providing explanations for decisions made by a machine-learning classifier model, for example.

Any specific manifestations of these and other similar artifacts are not intended to be limiting to the invention. Any suitable manifestation of these and other similar artifacts can be selected within the scope of the illustrative embodiments.

The examples in this disclosure are used only for the clarity of the description and are not limiting to the illustrative embodiments. Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

Furthermore, the illustrative embodiments may be implemented with respect to any type of data, data source, or access to a data source over a data network. Any type of data storage device may provide the data to an embodiment of the invention, either locally at a data processing system or over a data network, within the scope of the invention. Where an embodiment is described using a mobile device, any type of data storage device suitable for use with the mobile device may provide the data to such embodiment, either locally at the mobile device or over a data network, within the scope of the illustrative embodiments.

The illustrative embodiments are described using specific code, contrastive explanations, computer readable storage medium, high-level features, historical data, designs, architectures, protocols, layouts, schematics, and tools only as examples and are not limiting to the illustrative embodiments. Furthermore, the illustrative embodiments are described in some instances using particular software, tools, and data processing environments only as an example for the clarity of the description. The illustrative embodiments may be used in conjunction with other comparable or similarly purposed structures, systems, applications, or architectures. For example, other comparable mobile devices, structures, systems, applications, or architectures therefor, may be used in conjunction with such embodiment of the invention within the scope of the invention. An illustrative embodiment may be implemented in hardware, software, or a combination thereof.

The examples in this disclosure are used only for the clarity of the description and are not limiting to the illustrative embodiments. Additional data, operations, actions, tasks, activities, and manipulations will be conceivable from this disclosure and the same are contemplated within the scope of the illustrative embodiments.

Any advantages listed herein are only examples and are not intended to be limiting to the illustrative embodiments. Additional or different advantages may be realized by specific illustrative embodiments. Furthermore, a particular illustrative embodiment may have some, all, or none of the advantages listed above.

It is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Referring now to FIG. 1, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer system 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 1 are intended to be illustrative only and that computing nodes 10 and cloud computing environment 50 can communicate with any type of computerized device over any type of network and/or network addressable connection (e.g., using a web browser).

Figure 2:
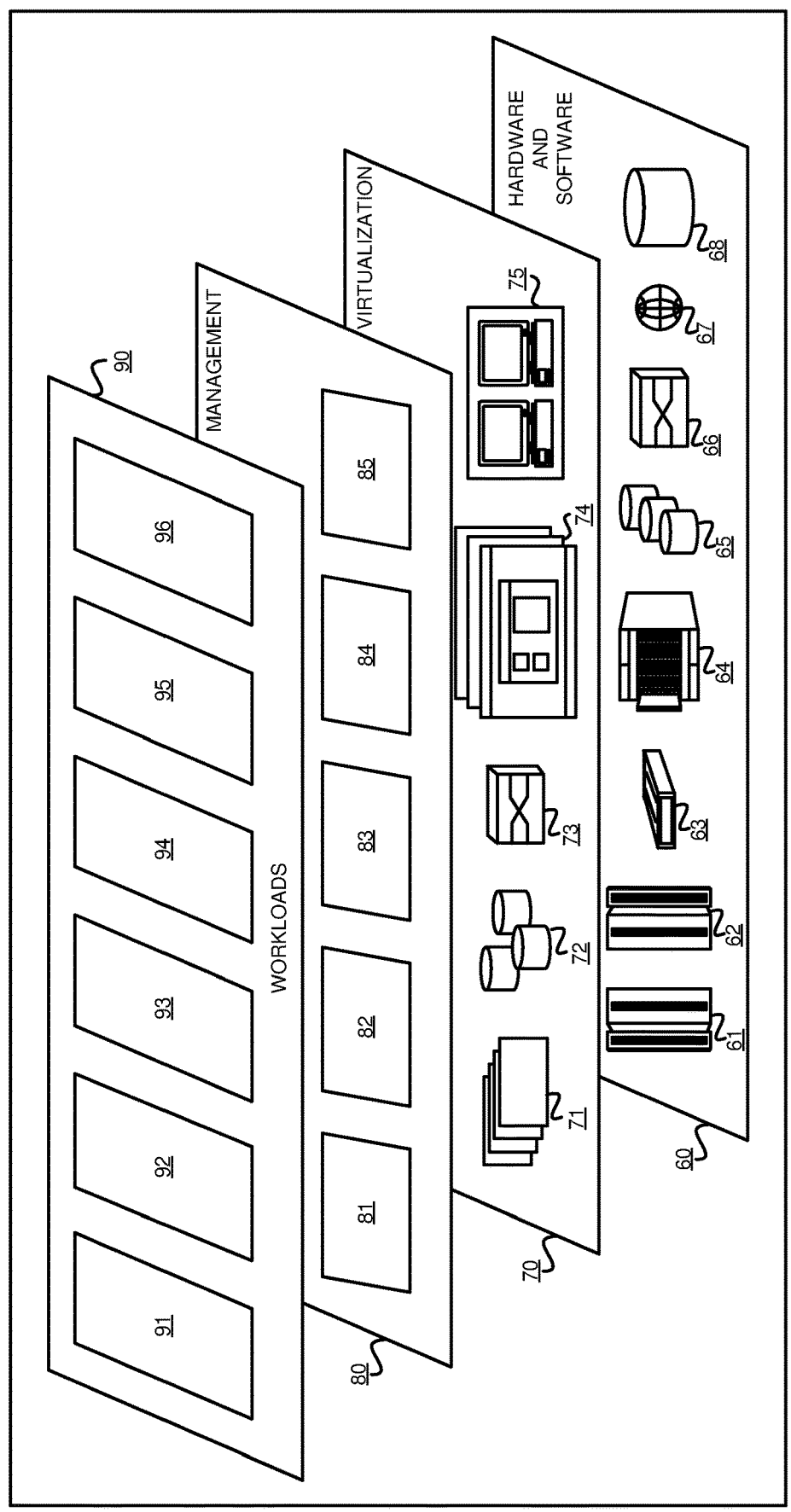
FIG. 2 depicts abstraction model layers according to an embodiment of the present invention.

Referring now to FIG. 2, a set of functional abstraction layers provided by cloud computing environment 50 (FIG. 1) is shown. It should be understood in advance that the components, layers, and functions shown in FIG. 2 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and worker schedule processing 96.

Figure 3:
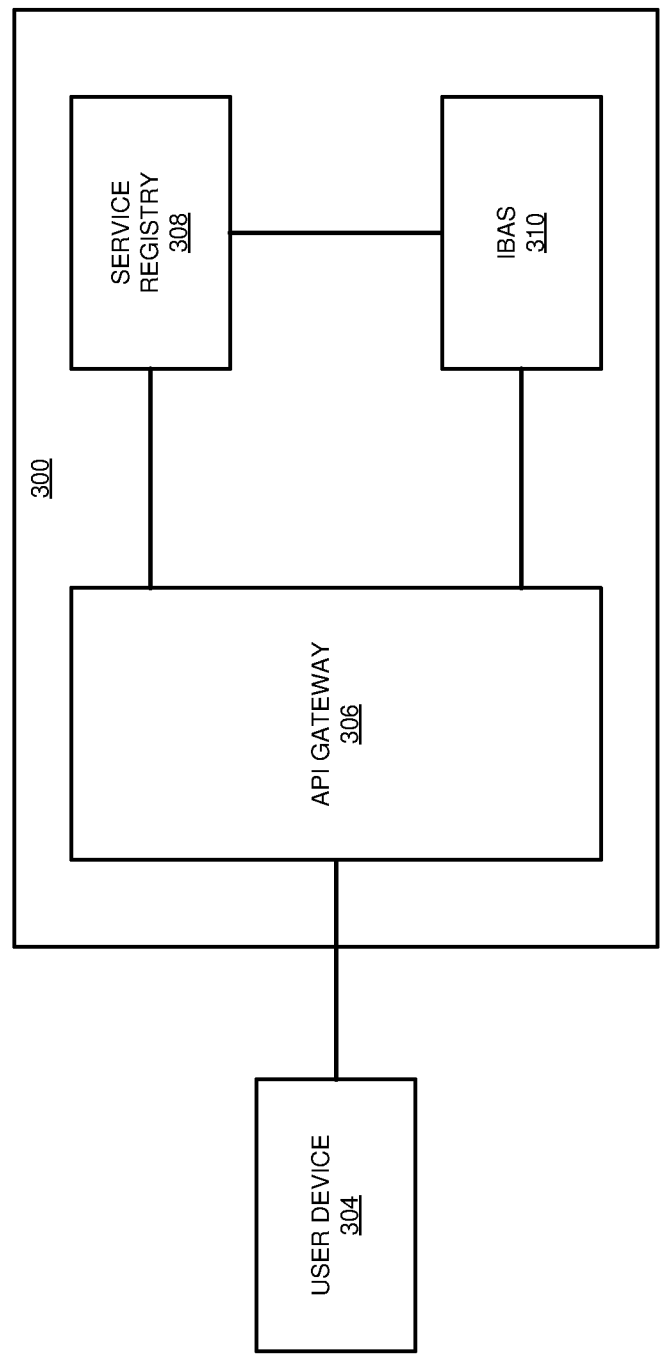
FIG. 3 depicts a block diagram of an example service infrastructure that includes an IBAS system in accordance with an illustrative embodiment.

With reference to FIG. 3, this figure depicts a block diagram of an example service infrastructure 300 that includes an IBAS system 310 in accordance with an illustrative embodiment. In some embodiments, the IBAS system 310 is deployed in workloads layer 90 of FIG. 2. By way of example, in some embodiments, IBAS system 310 is implemented as worker schedule processing 96 in FIG. 2.

In the illustrated embodiment, the service infrastructure 300 provides services and service instances to a user device 304. User device 304 communicates with service infrastructure 300 via an API gateway 306. In various embodiments, service infrastructure 300 and its associated IBAS 310 serve multiple users and multiple tenants. A tenant is a group of users (e.g., a company) who share a common access with specific privileges to the software instance. Service infrastructure 300 ensures that tenant specific data is isolated from other tenants.

In some embodiments, user device 304 connects with API gateway 306 via any suitable network or combination of networks such as the Internet, etc. and use any suitable communication protocols such as Wi-Fi, Bluetooth, etc. Service infrastructure 300 may be built on the basis of cloud computing. API gateway 306 provides access to client applications like IBAS 310. API gateway 306 receives service requests issued by client applications, and creates service lookup requests based on service requests. As a non-limiting example, in an embodiment, the user device 304 is a card reader device that executes an access routine to determine whether to grant access to a workspace in response to a sensed access card.

In the illustrated embodiment, service infrastructure 300 includes a service registry 308. In some embodiments, service registry 308 looks up service instances of IBAS 310 in response to a service lookup request such as one from API gateway 306 in response to a service request from user device 304. For example, in some embodiments, the service registry 308 looks up service instances of IBAS 310 in response to requests related to dubbing and machine translation from the user device 304.

In some embodiments, the service infrastructure 300 includes one or more instances of the IBAS 310. In some such embodiments, each of the multiple instances of the IBAS 310 run independently on multiple computing systems. In some such embodiments, IBAS 310, as well as other service instances of IBAS 310, are registered in service registry 308.

In some embodiments, service registry 308 maintains information about the status or health of each service instance including performance information associated each of the service instances. For example, as described in more detail herein, such performance information may include various types of performance characteristics of a given service instance (e.g., cache metrics, etc.). As described in more detail herein, extended service registry 308 ranks service instances based on their respective performance characteristics, and selects top-ranking service instances for service discovery or service lookup requests. In the event that a service instance becomes unresponsive or, unhealthy, the service registry will no longer provide its address or information about this service instance to other services.

Figure 4:
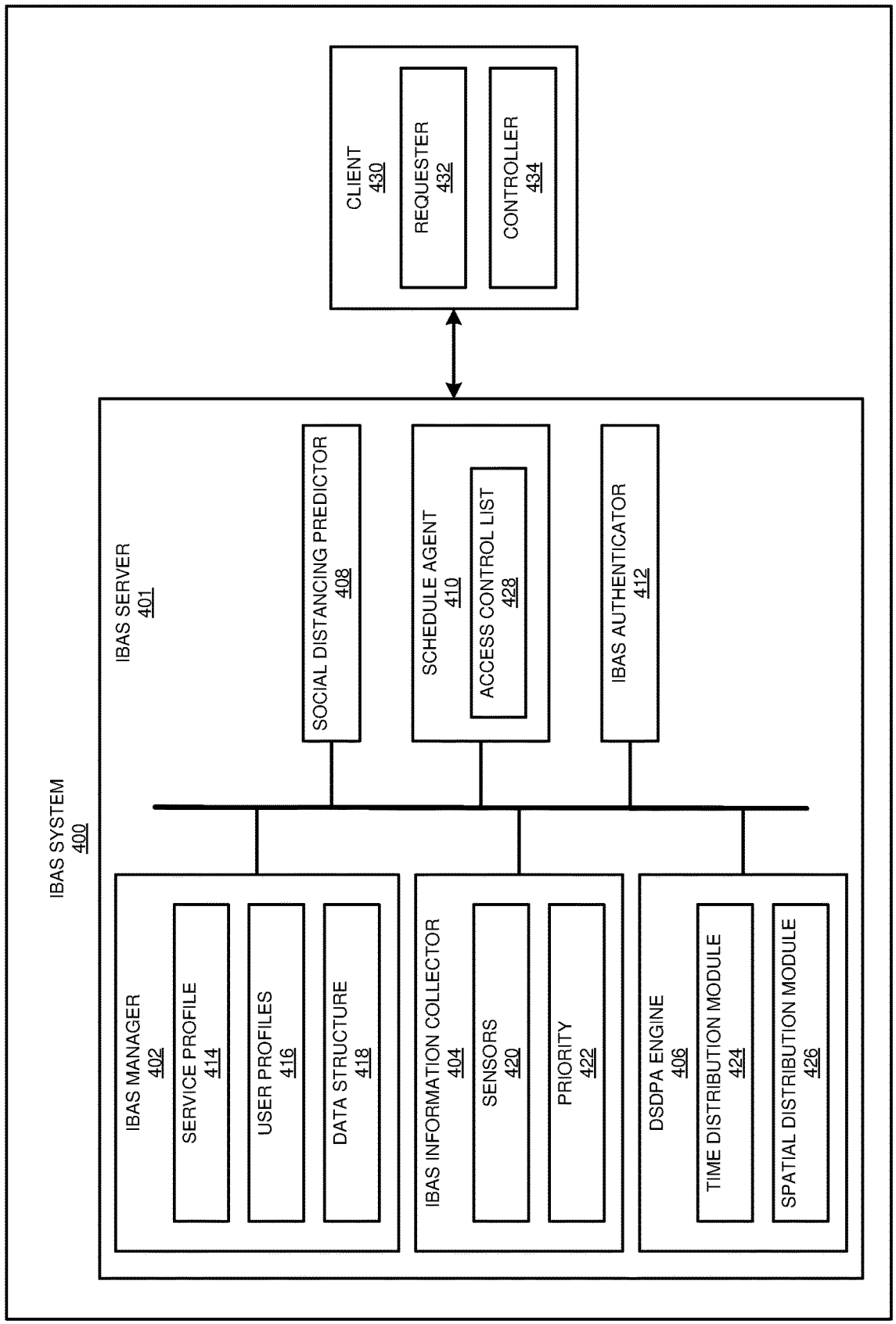
FIG. 4 depicts a block diagram of an example Intelligent Badge Access Scheduling (IBAS) system in accordance with an illustrative embodiment.

With reference to FIG. 4, this figure depicts a block diagram of an example din accordance with an illustrative embodiment. In a particular embodiment, IBAS system 400 is deployed as part of hardware and software layer 60, and comprises one or more mainframes 61, RISC (Reduced Instruction Set Computer) architecture based servers 62, servers 63, blade servers 64, storage devices 65, and networks and networking components 66. In some embodiments, software components include network application server software 67 and database software 68. In the illustrated embodiment, the IBAS system 400 includes an IBAS server 401 and IBAS client 430. In a particular embodiment, IBAS server 401 is an example of IBAS 310 of FIG. 3.

In the illustrated embodiment, IBAS server 401 includes an IBAS manager 402, an IBAS information collector 404, a dynamic social distancing pattern analysis (DSDPA) engine 406, a social distancing predictor, a schedule agent 410, and an IBAS authenticator 412. In the illustrated embodiment, the IBAS manager 402 includes a service profile 414, user profiles 416, and a data structure 418. In the illustrated embodiment, IBAS information collector 404 includes sensors 420 and a priority module 422. In the illustrated embodiment, DSDPA engine 406 includes a time distribution module 424 and a spatial distribution module 426. In the illustrated embodiment, the schedule agent 410 includes an access control list 428. In the illustrated embodiment, the IBAS server 401 communicates via the IBAS system 400 with one or more client devices, such as client device 430. In some embodiments, the client device 430 is an example of user device 304 in FIG. 3. In alternative embodiments, the client device 430 comprises software and/or hardware in a user device such as user device 430 in FIG. 3. In some such embodiments, the client device 430 comprises software and/or hardware in a badge reader (or other authentication-based access control mechanism).

In alternative embodiments, the IBAS server 401 can include some or all of the functionality described herein but grouped differently into one or more modules. In some embodiments, the functionality described herein is distributed among a plurality of systems, which can include combinations of software and/or hardware based systems, for example Application-Specific Integrated Circuits (ASICs), computer programs, or smart phone applications.

In the illustrated embodiment, IBAS manager 402 serves as a module for defining, storing, and managing the service profile 414, user profiles 416, and data structure 418. In some embodiments, the IBAS manager 402 includes a user interface for configuring and managing a basic badge access schedule. In some such embodiments, the user interface includes a graphical user interface (GUI), a command line interface, and/or an IBAS management dashboard. In some embodiments, the interface allows a user to submit various user inputs to the IBAS management dashboard, including schedule requests and access control list requests. In some embodiments, the interface includes form input elements that a user can populate with data that will be submitted as form data to submit schedule requests and access control list requests. In some embodiments, the interface allows a user to set configuration parameters for a schedule request and/or an access control list request. In some embodiments, the interface allows a user to edit the service profile 414, the user profiles 416, and the data structure 418. In some embodiments, the interface generates display data for displaying information on a display device, including any of the information described herein, including display of a GUI, command line, and/or dashboard displaying a schedule, access control list, service profile 414, user profiles 416, and data structure 418.

In the illustrated embodiment, the IBAS manager 402 allows a user, such as a system administrator, to view or edit the service profile 414. In some such embodiments, the service profile 414 is a service configuration file for defining and configuring the IBAS service. For example, in some embodiments, the service profile 414 includes constraints related to office space arrangement and availability. Such constraints may include, for example, minimum distance values used as social distancing constraints. Such constraints may include, for example, a description of workspaces where workers are scheduled to work, such as a floor plan or office layout. Such constraints may also include a description of workspace availability, such as hours during which the workspace may or may not be available for use and times during which meeting rooms are occupied or are available for use. Such constraints may also include capacity information, such as worker capacity limits for workspaces.

In the illustrated embodiment, the IBAS manager 402 allows a user, such as a system administrator or worker, to view or edit the user profiles 416. In some embodiments, the user profiles 416 is representative of a plurality of profiles for respective workers. In some embodiments, the user profiles 416 is representative of a single file that includes profile information for a plurality of workers. In some embodiments, the IBAS manager 402 allows users to edit their respective profiles to include customized profile information, such as information about personal characteristics and preference settings. In some embodiments, preference settings include preference data representative of a schedule preferences of one or more workers, such as preferred days, hours, shifts, or other such information. For example, in some embodiments, user profiles 416 includes schedule preference data representative of schedule preferences of workers collected in response to worker surveys. In some embodiments, user profiles 416 include preference information regarding notification preferences indicative of how the worker prefers to receive schedules and other work-related information.

In the illustrated embodiment, the IBAS manager 402 allows a user, such as a system administrator or worker, to view or edit the data structure 418. In some embodiments, the IBAS data structure 418 refers to a module for data structure for saving and track users' movement patterns and predicted social distance, and scheduled badge accessing times. As a non-limiting example, a data structure includes fields such as ReaderID, Priority[UserID][TaskID], MinimumDistance, StartTime, and EndTime. In some embodiments, one or more of these fields can be populated with associated values established by a system administrator. In some embodiments, a system administrator can update the data structure or data stored in the data structure in real time, for example to expand the capabilities of the IBAS server 401.

In the illustrated embodiment, the IBAS information collector 404 is a module for collecting all users' tasks with priorities (e.g., Priority[UserID][TaskID]) from the IBAS sensors 420. The sensors 420 may include any of a variety of available sensors, including known Internet of Things (IOT) sensors, that may be used to collect information about worker workspace locations and movement habits. In some embodiments, the illustrated sensors 420 block is representative of a sensor module that communicates with one or more remotely located sensors via a network connection. For example, in some embodiments, a workspace has one or more sensors located in various locations that are able to sense information regarding worker locations, tasks, or other information. In some such embodiments, the sensors provide the sensed information via ethernet or Wi-Fi to the IBAS information collector 404. In some such embodiments, the sensors provide the sensed information along with time information indicative of when the sensed data was sensed by a sensor.

In some embodiments, the priority module 422 used to prioritize access order/queue if both workers/requesters need to access a same location or locations that are near each other (e.g., within a distance specified for social distancing). For instance, if the first worker's first task is more important than the second worker's second task, then the first worker's supervisor may assign a priority value for the first worker's first task that is higher than a priority value associated with the second worker's second task. Exemplary embodiments then prioritize scheduling the first worker over the second worker.

Figure 6:
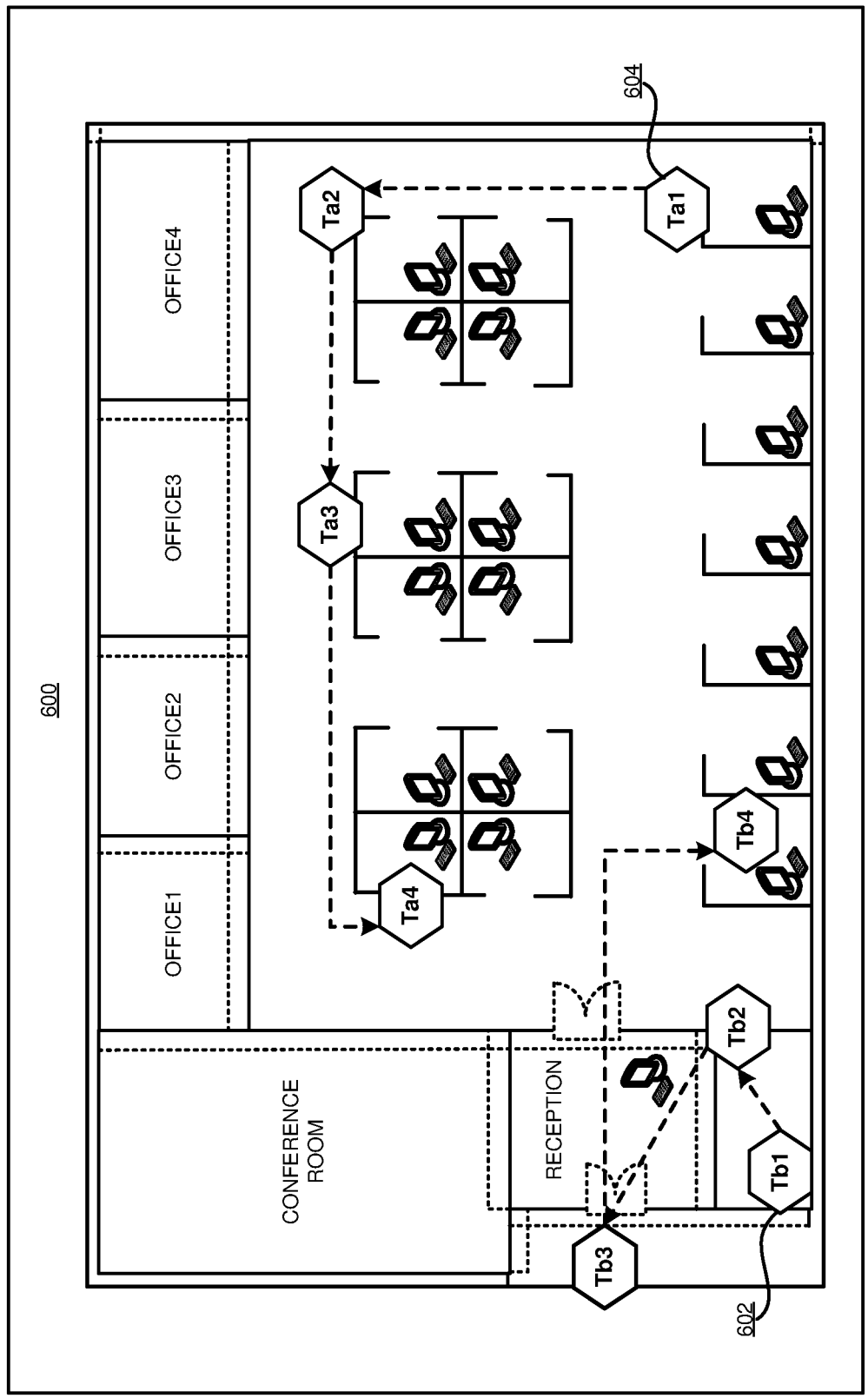
FIG. 6 depicts a diagram of an example workplace layout in accordance with an illustrative embodiment.
Figure 7:
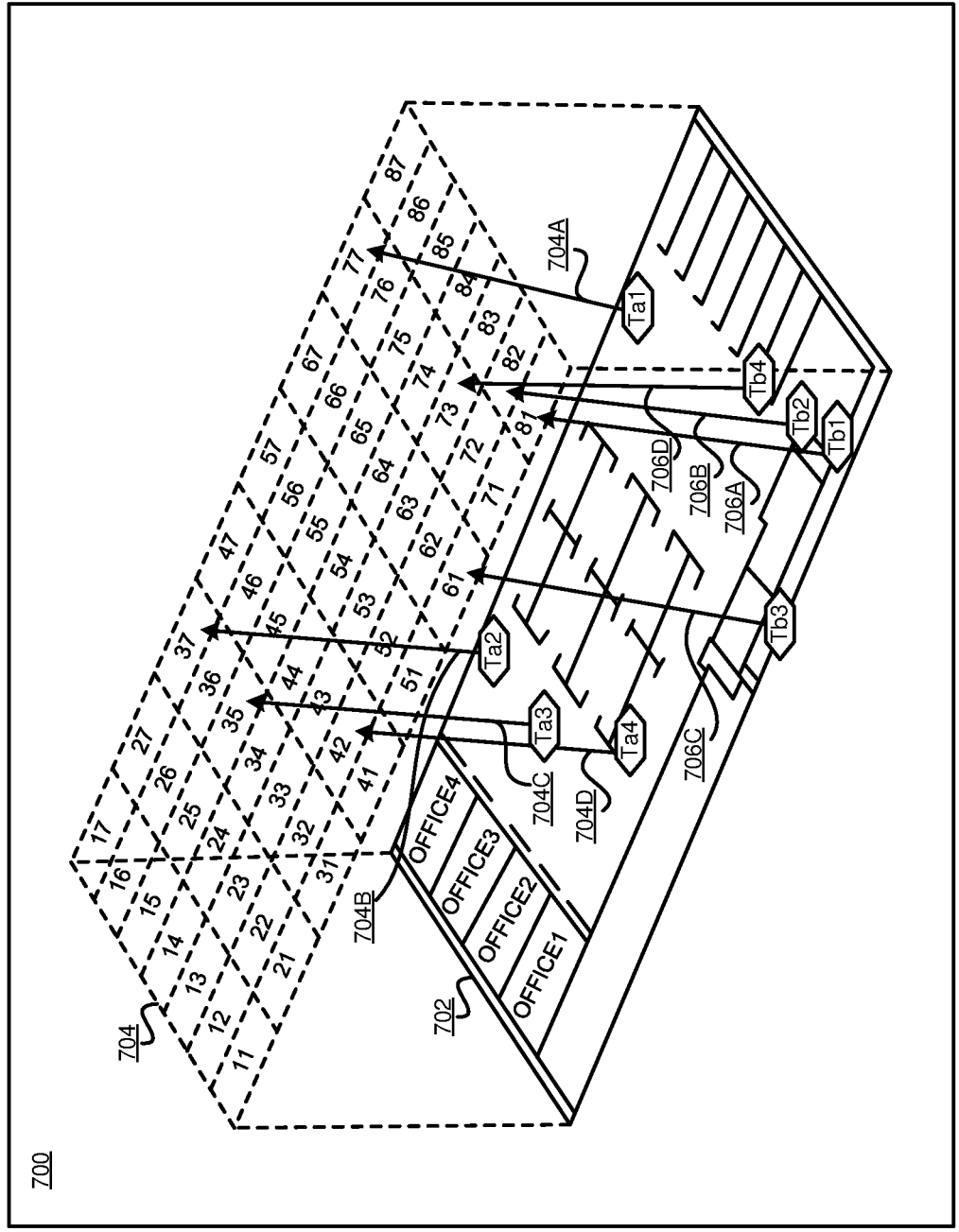
FIG. 7 depicts an exploded perspective view of an example grid overlay and workplace layout in accordance with an illustrative embodiment.

Referring also to FIGS. 6 and 7, FIG. 6 shows a non-limiting example of a workplace layout 600 and FIG. 7 shows a non-limiting example of an indexed layout 700 in accordance with illustrative embodiments. In some embodiments, the information in FIGS. 6 and 7 is collected by sensors, such as camera or proximity sensors, and shows actual sensed location information for workers that can be used to train a machine learning model to make predictions about where the workers are likely to be positioned in the workplace during scheduled work times. Also, in some embodiments, the information in FIGS. 6 and 7 is prediction information generated by a machine learning process that predicts where workers will likely be positioned in the workplace during scheduled work times, and the IBAS server 401 uses this information to determine whether the workers associated with the predictions (workers A and B in FIGS. 6 and 7) may be scheduled during a same block of time without encountering each other or without coming to close to each other to maintain specified social distancing constraints.

FIGS. 6 and 7 show icons Ta1-Ta4 associated with worker A, and icons Tb1-Tb4 associated with worker B. For both workers A and B, icon T*1 (i.e., Ta1 and Tb1) is associated with time 1, T*2 is associated with time 2, and so on. For example, if time 1 is 8:00 am, then Ta1 shows the location of worker A at 8:00 am (time 1) and Tb1 shows the location of worker B at 8:00 am (time 1). At time 2, worker A has traveled to location Ta2 and worker B has traveled to location Tb2. At time 3, worker A has traveled to location Ta3 and worker B has traveled to location Tb3. At time 4, worker A has traveled to location Ta4 and worker B has traveled to location Tb4.

In FIG. 7, the layout 600 from FIG. 6 has become a lower layer layout 702 in which the locations Ta1-Ta4 and Tb1-Tb4 have been mapped to identifier blocks on a grid 704. The grid allows the IBAS system to consistently and accurately refer to worker locations in the workplace layout 702. For example, arrow 704a shows location Ta1 mapped to identifier block 77, arrow 704b shows location Ta2 mapped to identifier block 37, arrow 704c shows location Ta3 mapped to identifier block 35, arrow 704d shows location Ta4 mapped to identifier block 42, arrow 706a shows location Tb1 mapped to identifier block 81, arrow 706b shows location Tb2 mapped to identifier block 82, arrow 706c shows location Tb3 mapped to identifier block 61, and arrow 706d shows location Tb4 mapped to identifier block 73. In some embodiments, the identifier blocks are used to measure distances between workers at given points in time.

Referring again to FIG. 4, in the illustrated embodiment, the DSDPA engine 406 is a microservice engine that receives clients' inputs, learns users' movement patterns over time and space, and predicts given users' locations and social distances. In the illustrated embodiment, the DSDPA engine 406 includes a time distribution module 424 and a spatial distribution module 426. In some embodiments, the time distribution module 424 is a module that learns and analyzes time distribution of workers in a given workspace, and defines and tracks workers that will be scheduled to be in the workspace during overlapping time periods. In some embodiments, the spatial distribution module 426 is a module that learns and analyzes the spatial distribution of workers in the workspace, and defines and tracks the respective locations of workers that are working at the workspace during overlapping time periods. In some embodiments, DSDPA engine 406 uses a machine learning model to predicts, detects, and prevents work assignments or worker schedules that are likely to result in workers being located in the workspace in a location that is too close to other workers to satisfy minimum social distancing guidelines.

In the illustrated embodiment, the social distancing predictor is a module that performs pattern analysis to predict whether workers present during overlapping time periods are likely to maintain social distancing guidelines in the shared work area. In some embodiments, the social distancing predictor 408 uses data from the IBAS information collector 404, including historical user behavior information to predict social distancing problems in schedules or access lists.

In some embodiments, the social distancing predictor 408 ingests location information from the IBAS information collector 404 to generate location pattern predictions. In some embodiments, location pattern predictions are location patterns such as times when a worker is at various workplace locations. In some embodiments, the patterns also characterize when a worker will leave a location and which location they will be going to next. In some embodiments, the modeling of the patterns relies on a plurality of pattern models. In some embodiments, a pattern model is an algorithmic model that predicts location based on past location information. A pattern model may be geared to a specific type of pattern such as time frame or location type. In some embodiments, the pattern models are Markov chains, but alternatively a pattern model may be a neural network, a statistical model, machine learning approach, or any suitable pattern model. In some embodiments, each Markov chain is associated with different workers. For example, in some embodiments, a first Markov chain characterizes location patterns during a workday for a first worker, and a second Markov chain characterizes location patterns during a workday for a second worker.

In some embodiments, the schedule agent 410 is a module that generates preliminary worker schedules. In some embodiments, the schedule agent 410 compares location patterns associated with different workers in the preliminary schedule who will be in the workplace during overlapping time periods. For example, in some embodiments, the access control schedule 800 of FIG. 8 is a preliminary schedule in which three workers—User-A, User-B, and User-C—are assigned to be in the workplace during time block T2. In this example, the schedule agent 410 compares location patterns associated with each of these three workers.

In some embodiments, the location patterns shown in FIG. 6 are predictions generated by the social distancing predictor 408. In some such embodiments, the location predictions in FIG. 6 include locations Ta4 and Tb4, which are predicted locations for User-A and User-B at a time T4. In some embodiments, if the locations Ta4 and Tb4 are too close to comply with social distancing constraints, then the schedule agent 410 reschedules the worker that is assigned a lower priority task. For example, if User-A is assigned a higher priority task than User-B, then the schedule agent 410 finalizes the preliminary schedule for User-A ad changes the preliminary schedule for User-B, and repeats the process with User-B and any other users having schedules with overlapping time periods.

In some embodiments, the schedule agent 410 generates an access control list 428 that includes time blocks of time and respective lists of workers that are allowed to be in the workplace during the respective time block. In some embodiments, the access control list 428 is used by a building security system that controls access points to the workspace.

In some embodiments, the IBAS authenticator 412 maintains a list of workers and respective access credential information. For example, in some embodiments, the IBAS authenticator 412 incudes information that allows a remote card reader to determine which worker is associated with a card that was just scanned.

In the illustrated embodiment, the client device 430 includes a requester 432 and a controller 434. In some embodiments, the requester 432 communicates with the IBAS server 401, for example using an API that allows remote devices to interface with the IBAS server 401. As a non-limiting example, in an embodiment, the client device 430 is a card reader device in which the controller 434 executes an access routine to determine whether to grant access to a workspace in response to a sensed access card. In some such embodiments, the controller 434 instructs the requester 432 to interface with the IBAS server 401 in order to identify the worker associated with the sensed access card and whether that worker is authorized to access the workspace at the time when the access card was sensed. In some such embodiments, the IBAS authenticator 412 identifies the worker and checks the access control list 428 to determine the access times for the identified worker. The IBAS authenticator 412 then issues a response to the requester 432, where the response indicates the identity of the worker and/or whether the identified worker is presently allowed to have access to the workspace.

Figure 5:
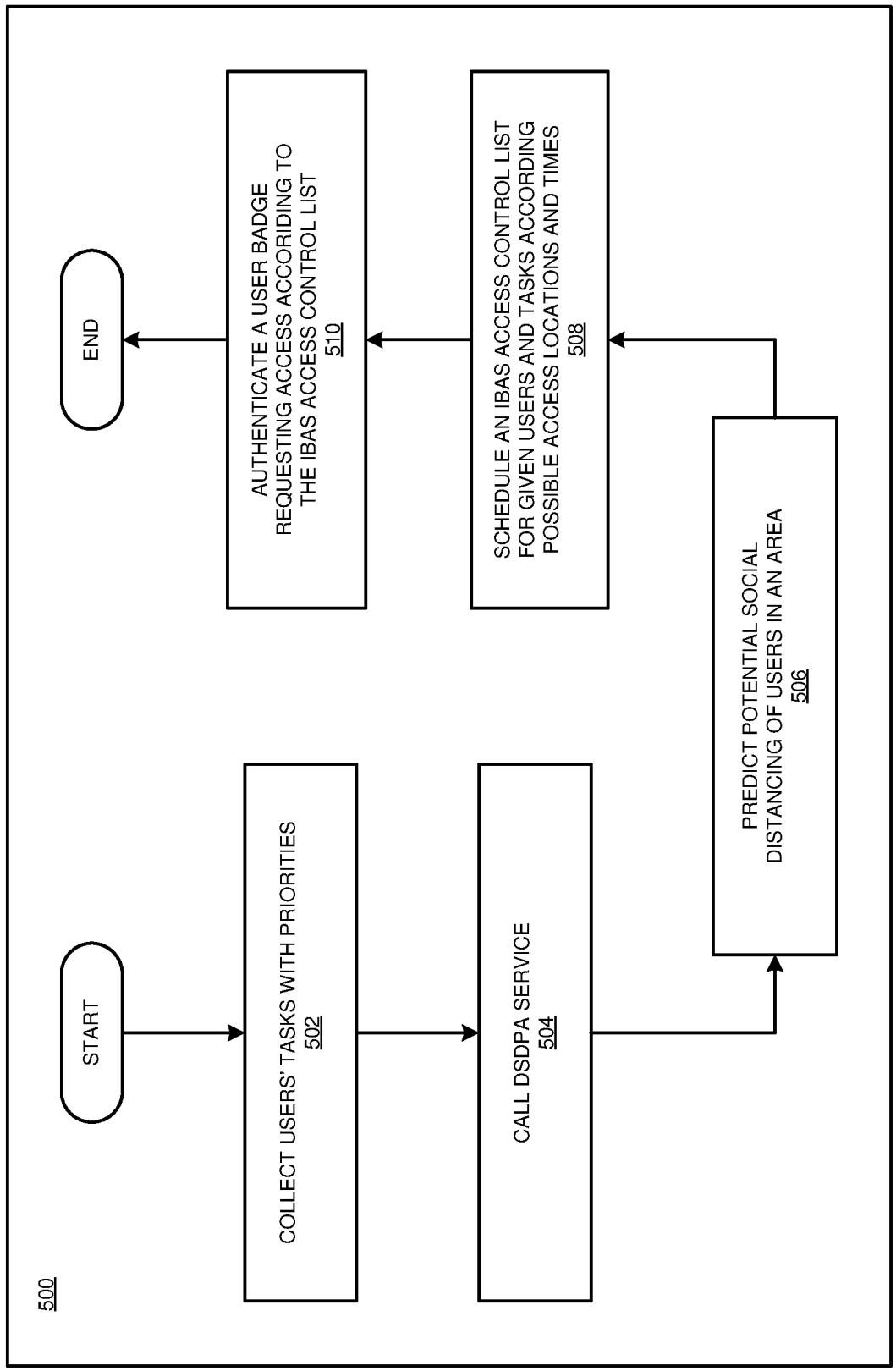
FIG. 5 depicts a flowchart of an example process for automatic pattern analysis for schedule optimization in accordance with an illustrative embodiment.

With reference to FIG. 5, this figure depicts a flowchart of an example process 500 for automatic pattern analysis for schedule optimization in accordance with an illustrative embodiment. In some embodiments, the process 500 is performed by IBAS 310 of FIG. 3 or IBAS server 401 of FIG. 4.

In an embodiment, at block 502, the process collects users' tasks with priorities. Next, at block 504, the process performs pattern analysis, for example by calling a local or remote DSDPA service such as the DSDPA engine 406 of FIG. 4 described herein. Next, at block 506, the process predicts potential social distancing of users in an area. For example, in some such embodiments, the process predicts distances between workers in a workplace at different points in time when the workers are scheduled to be at the workplace. In some embodiments, the distances are predicted using machine learning models that are based on historic data regarding the worker's workplace habits. In some embodiments, the process uses the social distancing predictor 408 of FIG. 4 to make these distance predictions. Next, at block 508, the process schedules an IBAS access control list for given users and tasks according possible access locations and times. For example, in some embodiments, the process generates an access schedule that lists access days and times for each of a plurality of workers indicating days and times when the respective workers may be granted access to the workplace. In some embodiments, the process also includes additional information in the access control list, such as where each worker should enter or exit the workplace, where the worker should perform an assigned task in the workplace, or any other information that may be useful for providing guidance to workers about when and where they should perform assigned tasks. Next, at block 510, the process operates as a backend system for security systems that limit access to a workplace, such as card readers or biometric scanners. For example, in the illustrated embodiment, the process responds to an access query from a security device regarding a scanned card (e.g., worker badge or identification card), and responsive to the query, the process identifies the worker associated with the card and authenticates the worker based on the worker's name appearing on an IBAS access control list during the time when the card was scanned (or denies access if the worker is not presently scheduled to have access).

With reference to FIG. 8, this figure depicts a block diagram of an example access control schedule 800 in accordance with an illustrative embodiment. In a particular embodiment, access control schedule 800 is an example of access control list 428 of FIG. 4 and is generated by schedule agent 410 of FIG. 4.

In the illustrated embodiment, the access control schedule 800 only shows schedules for five workers (User-A to User-E), whereas an actual access control schedule 800 may include schedules for dozens or hundreds of workers. Also, the access control schedule 800 only shows schedules for three blocks of time (or work shifts) T2 and T3, whereas an actual access control schedule 800 may include schedules for dozens or hundreds of blocks of time. In the illustrated embodiment, which is non-limiting example, workers User- A, User-B, and User-C are scheduled to have access to the workplace during time block T2 as indicated at block 802, whereas workers User-D and User-E are scheduled to have access to the workplace during time block T3 and during time block T4. Thus, in some embodiments, an authentication system uses the access control schedule 800 to allow workers User-A, User-B, and User-C to have access to the workplace during time block T2, and allow workers User-D and User-E to have access to the workplace during time blocks T3 and T4. Otherwise, the authentication system denies these workers access to the workplace (e.g., User-A is granted access during time block T2 but is denied access during time blocks T1 and T3-T6).

The following definitions and abbreviations are to be used for the interpretation of the claims and the specification. As used herein, the terms "comprises," "comprising," "includes," "including," "has," "having," "contains" or "containing," or any other variation thereof, are intended to cover a non-exclusive inclusion. For example, a composition, a mixture, process, method, article, or apparatus that comprises a list of elements is not necessarily limited to only those elements but can include other elements not expressly listed or inherent to such composition, mixture, process, method, article, or apparatus.

Additionally, the term "illustrative" is used herein to mean "serving as an example, instance or illustration." Any embodiment or design described herein as "illustrative" is not necessarily to be construed as preferred or advantageous over other embodiments or designs. The terms "at least one" and "one or more" are understood to include any integer number greater than or equal to one, i.e., one, two, three, four, etc. The terms "a plurality" are understood to include any integer number greater than or equal to two, i.e., two, three, four, five, etc. The term "connection" can include an indirect "connection" and a direct "connection."

References in the specification to "one embodiment," "an embodiment," "an example embodiment," etc., indicate that the embodiment described can include a particular feature, structure, or characteristic, but every embodiment may or may not include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described.

The terms "about," "substantially," "approximately," and variations thereof, are intended to include the degree of error associated with measurement of the particular quantity based upon the equipment available at the time of filing the application. For example, "about" can include a range of ±8% or 5%, or 2% of a given value.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

The descriptions of the various embodiments of the present invention have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments described herein.

Thus, a computer implemented method, system or apparatus, and computer program product are provided in the illustrative embodiments for managing participation in online communities and other related features, functions, or operations. Where an embodiment or a portion thereof is described with respect to a type of device, the computer implemented method, system or apparatus, the computer program product, or a portion thereof, are adapted or configured for use with a suitable and comparable manifestation of that type of device.

Where an embodiment is described as implemented in an application, the delivery of the application in a Software as a Service (SaaS) model is contemplated within the scope of the illustrative embodiments. In a SaaS model, the capability of the application implementing an embodiment is provided to a user by executing the application in a cloud infrastructure. The user can access the application using a variety of client devices through a thin client interface such as a web browser (e.g., web-based e-mail), or other light-weight client-applications. The user does not manage or control the underlying cloud infrastructure including the network, servers, operating systems, or the storage of the cloud infrastructure. In some cases, the user may not even manage or control the capabilities of the SaaS application. In some other cases, the SaaS implementation of the application may permit a possible exception of limited user-specific application configuration settings.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus, or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

Embodiments of the present invention may also be delivered as part of a service engagement with a client corporation, nonprofit organization, government entity, internal organizational structure, or the like. Aspects of these embodiments may include configuring a computer system to perform, and deploying software, hardware, and web services that implement, some or all of the methods described herein. Aspects of these embodiments may also include analyzing the client's operations, creating recommendations responsive to the analysis, building systems that implement portions of the recommendations, integrating the systems into existing processes and infrastructure, metering use of the systems, allocating expenses to users of the systems, and billing for use of the systems. Although the above embodiments of present invention each have been described by stating their individual advantages, respectively, present invention is not limited to a particular combination thereof. To the contrary, such embodiments may also be combined in any way and number according to the intended deployment of present invention without losing their beneficial effects.

What is claimed is:

1. A computer-implemented method in an authentication-based access control system (ACS) comprising:
    configuring an authentication-based access control system (ACS) with a sensor interface, a machine learning model (ML model), a schedule generation module, and a data structure;
    causing the sensor interface to communicate with a set of location sensing sensors over a data network;
    detecting using the set of sensors, a location and physical movements of a first worker and a location and physical movements of a second worker in a workspace plan;
    generating, by executing the schedule generation module, a first preliminary schedule for a first task assigned to the first worker and a second preliminary schedule for a second task assigned to the second worker;

predicting, by executing the ML model, physical movements of a plurality of workers in the workspace plan, the predicting preventing a generation of worker schedules that are likely to result in workers being located within a distance of less than a threshold value in the workspace plan;

storing in a computer memory location associated with the data structure, a first block of time that is part of the first preliminary schedule and the second preliminary schedule;

generating from the ML model a first location prediction for the first worker during the first block of time;

generating from the ML model a second location prediction for the second worker during the first block of time;

outputting from the ML model a predicted distance between the first worker and the second worker based on the first location prediction and the second location prediction;

revising, responsive to determining that the distance is less than the threshold value, the second preliminary schedule to replace the first block of time with a second block of time that is not part of the first preliminary schedule;

generating an access control list that includes the first preliminary schedule as a first access schedule for the first worker; and responding to an access query regarding the first worker by referring to the first access control list and determining whether the first access schedule includes a time associated with the access query, the access query being received by the ACS from an access control device configured in the ACS.

2. The computer-implemented method of claim 1, further comprising:
identifying that the second task has a lower priority than the first task.

3. The computer-implemented method of claim 2, further comprising:
selecting the second preliminary schedule for revision based on the second task having a lower priority than the first task.

4. The computer-implemented method of claim 2, wherein the first location prediction includes a first probability that the first worker will be at a first location at a designated time in the first block of time.

5. The computer-implemented method of claim 4, wherein the second location prediction includes a second probability that the second worker will be at a second location at the designated time in the first block of time.

6. The computer-implemented method of claim 5, wherein the calculating of the distance comprises calculating an amount of space between the first location and the second location.

7. The computer-implemented method of claim 1, wherein the threshold value is based on a prescribed social distancing constraint.

8. The computer-implemented method of claim 1, wherein the generating of the first preliminary schedule is based at least in part on sensor data representative of historical time and location data associated with the first worker.

9. The computer-implemented method of claim 8, wherein the generating of the second preliminary schedule is based at least in part on sensor data representative of historical time and location data associated with the second worker.

10. A computer program product comprising one or more computer readable storage media, and program instructions collectively stored on the one or more computer readable storage media, the program instructions executable by a processor to cause the processor to perform operations in an authentication-based access control system (ACS) comprising:

configuring an authentication-based access control system (ACS) with a sensor interface, a machine learning model (ML model), a schedule generation module, and a data structure;

causing the sensor interface to communicate with a set of location sensing sensors over a data network;

detecting using the set of sensors, a location and physical movements of a first worker and a location and physical movements of a second worker in a workspace plan;

generating, by executing the schedule generation module, a first preliminary schedule for a first task assigned to the first worker and a second preliminary schedule for a second task assigned to the second worker;

predicting, by executing the ML model, physical movements of a plurality of workers in the workspace plan, the predicting preventing a generation of worker schedules that are likely to result in workers being located within a distance of less than a threshold value in the workspace plan;

storing in a computer memory location associated with the data structure, a first block of time that is part of the first preliminary schedule and the second preliminary schedule;

generating from the ML model a first location prediction for the first worker during the first block of time;

generating from the ML model a second location prediction for the second worker during the first block of time;

outputting from the ML model a predicted distance between the first worker and the second worker based on the first location prediction and the second location prediction;

revising, responsive to determining that the distance is less than the threshold value, the second preliminary schedule to replace the first block of time with a second block of time that is not part of the first preliminary schedule;

generating an access control list that includes the first preliminary schedule as a first access schedule for the first worker; and responding to an access query regarding the first worker by referring to the first access control list and determining whether the first access schedule includes a time associated with the access query, the access query being received by the ACS from an access control device configured in the ACS.

11. The computer program product of claim 10, wherein the stored program instructions are stored in a computer readable storage device in a data processing system, and wherein the stored program instructions are transferred over a network from a remote data processing system.

12. The computer program product of claim 10, wherein the stored program instructions are stored in a computer readable storage device in a server data processing system, and wherein the stored program instructions are downloaded in response to a request over a network to a remote data processing system for use in a computer readable storage device associated with the remote data processing system, further comprising:

program instructions to meter use of the program instructions associated with the request; and program instructions to generate an invoice based on the metered use.

13. The computer program product of claim 10, further comprising:

identifying that the second task has a lower priority than the first task.

14. The computer program product of claim 13, further comprising:

selecting the second preliminary schedule for revision based on the second task having a lower priority than the first task.

15. The computer program product of claim 13, wherein the first location prediction includes a first probability that the first worker will be at a first location at a designated time in the first block of time.

16. The computer program product of claim 15, wherein the second location prediction includes a second probability that the second worker will be at a second location at the designated time in the first block of time.

17. A computer system comprising a processor and one or more computer readable storage media, and program instructions collectively stored on the one or more computer readable storage media, the program instructions executable by the processor to cause the processor to perform operations in an authentication-based access control system (ACS) comprising:

configuring an authentication-based access control system (ACS) with a sensor interface, a machine learning model (ML model), a schedule generation module, and a data structure;

causing the sensor interface to communicate with a set of location sensing sensors over a data network;

detecting using the set of sensors, a location and physical movements of a first worker and a location and physical movements of a second worker in a workspace plan;

generating, by executing the schedule generation module, a first preliminary schedule for a first task assigned to the first worker and a second preliminary schedule for a second task assigned to the second worker;

predicting, by executing the ML model, physical movements of a plurality of workers in the workspace plan, the predicting preventing a generation of worker schedules that are likely to result in workers being located within a distance of less than a threshold value in the workspace plan;

storing in a computer memory location associated with the data structure, a first block of time that is part of the first preliminary schedule and the second preliminary schedule;

generating from the ML model a first location prediction for the first worker during the first block of time;

generating from the ML model a second location prediction for the second worker during the first block of time;

outputting from the ML model a predicted distance between the first worker and the second worker based on the first location prediction and the second location prediction;

revising, responsive to determining that the distance is less than the threshold value, the second preliminary schedule to replace the first block of time with a second block of time that is not part of the first preliminary schedule;

generating an access control list that includes the first preliminary schedule as a first access schedule for the first worker; and responding to an access query regarding the first worker by referring to the first access control list and determining whether the first access schedule includes a time associated with the access query, the access query being received by the ACS from an access control device configured in the ACS.

18. The computer system of claim 17, further comprising:

identifying that the second task has a lower priority than the first task.

19. The computer system of claim 18, further comprising:

selecting the second preliminary schedule for revision based on the second task having a lower priority than the first task.

20. The computer system of claim 18, wherein the first location prediction includes a first probability that the first worker will be at a first location at a designated time in the first block of time.

* * * * *